United States Patent [19]

Cook

[11] Patent Number: 4,839,230
[45] Date of Patent: Jun. 13, 1989

[54] RADIATION-POLYMERIZABLE CELLULOSE ESTERS

[75] Inventor: Phillip M. Cook, Kingsport, Tenn.

[73] Assignee: Eastman Kodak Company, Rochester, N.Y.

[21] Appl. No.: 147,474

[22] Filed: Jan. 25, 1988

[51] Int. Cl.$^4$ .............................................. B32B 27/00
[52] U.S. Cl. ................................. 428/423.1; 106/190; 106/191; 522/89; 524/315; 524/356; 524/560; 524/590; 428/532; 428/535; 428/425.1; 428/425.6; 428/464; 527/301; 527/314; 526/238.21; 536/63; 536/66
[58] Field of Search ............... 536/63, 66; 526/238.21; 527/301, 314; 522/89; 428/423.1, 532, 535, 425.1, 425.6, 464; 524/356, 315, 560, 590; 106/190, 191

[56] References Cited

U.S. PATENT DOCUMENTS

| | | | |
|---|---|---|---|
| 3,749,592 | 7/1973 | Gaske et al. | 117/62 |
| 4,112,182 | 9/1978 | Newland et al. | 428/336 |
| 4,147,603 | 4/1979 | Pacifici et al. | 204/159 |
| 4,404,347 | 9/1983 | Nakamura et al. | 527/300 |
| 4,490,516 | 12/1984 | Verbanac | 527/312 |
| 4,565,857 | 1/1986 | Grant | 827/301 |
| 4,656,202 | 4/1987 | Nason et al. | 522/89 |

*Primary Examiner*—Melvin I. Marquis
*Attorney, Agent, or Firm*—Thomas R. Savitsky; William P. Heath, Jr.

[57] ABSTRACT

The present invention relates to a grafted cellulose ester prepared by reacting a cellulose ester containing residual hydroxyl groups with an acrylic based compound and m-isopropenyl-$\alpha,\alpha'$-dimethylbenzyl isocyanate. The grafted cellulose ester is a urethane-containing product having pendant (meth)acrylate and $\alpha$-methylstyrene moieties. The grafted cellulose ester is readily self-polymerizable in the presence of a photoinitiator upon exposure to ultraviolet radiation. It does not require the presence of vinyl monomers to become crosslinked. The grafted cellulose ester is useful as a protective/decorative coating for wood, metal, plastics, and other substrates.

26 Claims, No Drawings

RADIATION-POLYMERIZABLE CELLULOSE ESTERS

FIELD OF THE INVENTION

This invention relates to certain polymerizable cellulose esters having pendant acrylic and α-methystyrene moieties. The polymers form an insoluble crosslinked polymer network under the influence of ultraviolet radiation. Such crosslinked polymers display greatly improved resistance to surface damage caused by solvents, stains, or abrasion.

BACKGROUND OF THE INVENTION

Protective coatings can be either thermoplastic or thermosetting. The advantages of a thermoplastic coating such as a cellulose ester wood coating include ease of application, low toxicity, good substrate wetting and gap-filling capabilities, good solvent compatibility, easily sanded and buffed, and numerous others. However, such thermoplastic coatings are easily damages by solvents and in general do not have good scratch resistance.

Thermoset coatings, however, have excellent solvent resistance and hardness properties, but they also have serious disadvantages. Most are thermally cured and their use is limited to substress that are stable at the curing temperatures which can be as much as 230° C. Moisture-cured systems have been used to overcome the use of high cure temperatures but these have prolonged cure times and have humidity requirements. The use of ultraviolet radiation to transform a photocrosslinkable thermoplastic coating into a thermoset coating represents a desirable technological improvement. Curing can occur over a period of seconds to yield a hard, durable coating. In this manner, the advantages of both thermoplastic and thermosettable polymers can be maintained.

It would be desirable to develop a photocrosslinkable cellulose ester coating which would preserve the advantages traditionally associated with the use of cellulose ester lacquers and after exposure to suitable radiation would possess greatly improved solvent resistance and hardness properties. Such a product would have an enhanced utility in wood finishing operations where it is desirable to apply a lacquer coating on the substrate that may be sanded, buffed, repaired, or even removed by solvent as desired during the finishing operation. As the final step in the process, the coated substrate is exposed to ultraviolet radiation whereupon the solvent-removable thermoplastic coating becomes an insoluble solvent-resistant thermoset coating.

Attempts have been made in the prior art to achieve such a desired coating, however, such attempts have major deficiencies. For example, the crosslinkable cellulose esters described in U.S. Pat. Nos. 4,112,182; 4,490,516; 3,749,592; and 4,147,603 do not provide a desired level of solvent resistance and hardness.

Photopolymerizable cellulose esters described in U.S. Pat. No. 4,565,857 display a wide range of reactivities. For example, cellulose acetate propionate grafted with 0.9 moles of 2-isocyanatoethyl methacrylate per mole of anhydroglucose units has a short pot life in the presence of peroxides or a photoinitiator such as Irgacure ® 651 (Ciba-Geigy) and can gel unexpectedly.

Other cellulose esters such as cellulose acetate propionate grafted with 0.9 moles of m-isopropenyl-α,α'-dimethylbenzyl isocyanate per mole of anhydroglucose units fails to polymerize to any significant degree in the presence of peroxides or a photoinitiator. It requires the presence of vinyl monomers and is not "self-crosslinkable."

Coatings of this material alone fail to polymerize and are easily removed by solvents. They also fail to develop a sufficient degree of hardness because they do not react to the extent that a crosslinked polymer network is formed.

The present invention provides cellulose esters that are capable of self-crosslinking (i.e., without the need of a vinyl comonomer). The present invention also provides coatings based on such cellulose esters for wood, metal, plastics, and the like that have properties such as improved solvent resistance and pencil hardness.

SUMMARY OF THE INVENTION

The present invention is directed to an ethylenically unsaturated self-crosslinkable cellulose ester of the formula

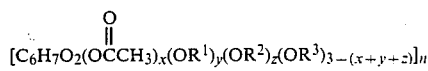

wherein:
$R^1$ is a (meth)acrylate moiety of the formula

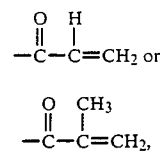

$R^2$ is α-methylstyrene moiety of the formula

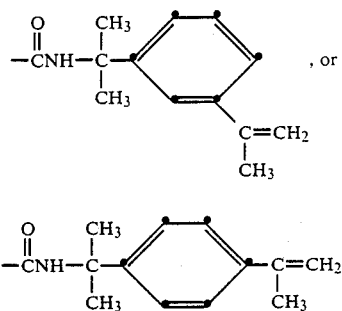

$R^3$ is, independently, H,

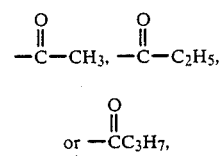

x is 0.1 to 2.5,
y is 0.1 to 2.0,
z is 0.1 to 2.0, and
n is 30–250, provided that (x +y +z) is in the range of 0.3 to 3.0.

The present invention is also directed to a coating composition comprising the cellulose ester of the present invention and a suitable solvent in an amount sufficient to solubilize said cellulose ester.

The present invention is also directed to a coated article comprising a substrate and a polymerized cellulose ester of the present invention.

The present invention is also directed to a process for preparing the cellulose ester of the present invention.

Comprising: reacting
(a) (meth)acrylic anhydride, or a mixture of (meth)acryloyl halide and a hydrogen acceptor, with
(b) an intermediate reaction product of
  (i) a cellulose ester of cellulose and at least one saturated monocarboxylic acid having 2 to 4 carbon atoms, wherein said cellulose ester has a degree of substitution per anhydroglucose unit of residual hydroxyl groups of about 0.1 to 2.0, and
  (ii) meta-isopropenyl-2,2'-dimethylbenzyl isocyanate,
in the presence of a suitable solvent and under conditions such that the desired product is formed.

The present invention is also directed to another process for preparing the cellulose ester to the present invention.

Comprising: reacting
(a) meta-isopropenyl-2,2'-dimethylbenzyl isocyanate, with
(b) an intermediate reaction product of (i) a cellulose ester of cellulose and at least one saturated monocarboxylic acid having 2 to 4 carbon atoms, wherein said cellulose ester has a degree of substitution per anhydroglucose unit of residual hydroxyl groups of about 0.1 to 2.0, and
  (ii) (meth)acrylic anhydride, or (meth)acryloyl halide and a hydrogen acceptor,
in the presence of a suitable solvent and a catalytic amount of a urethane bond-forming catalyst, and under conditions such that the desired product is formed.

Finally, the present invention is also directed to a process for facilitating isolating the cellulose ester of the present invention wherein said cellulose ester is in unprecipitated form and is in a mixture with reaction by-products and a suitable solvent, comprising: contacting said mixture with an amount of nonsolvent sufficient to precipitate the desired product.

DETAILED DESCRIPTION OF THE INVENTION

The grafted cellulose ester of the present invention is a resin which contains pendant vinyl groups which upon exposure to ultraviolet radiation in the presence of a photoinitiator form a crosslinked polymeric network. The crosslinking of these grafted cellulose esters is not dependent upon the presence of vinyl monomers, that is, they are "self-crosslinkable."

As used herein the term "(meth)acrylate" means either acrylate or methacrylate; "(meth)acrylic acid" means acrylic acid or methacrylic acid; "(meth)acrylic anhydride" means acrylic anhydride or methacrylic anhydride; "(meth)acryloyl halide" means acryloyl halide or methacryloyl halide; and "halide" means chloride, bromide, fluoride, or iodide.

In the cellulose ester of the present invention it is preferred that x is about 0.1 to about 0.25, y is about 0.1 to 0.5 and z is about 0.1 to 0.9.

In the coating composition of the present invention the suitable solvent must be one in which the grafted cellulose ester is soluble, therefore water and most aliphatic hydrocarbons are not suitable for this purpose. Typical examples of such suitable solvents include, but are not limited to ketones, esters, aromatic hydrocarbons, and chlorinated hydrocarbons. Specific examples include, but are not limited to, acetone, 2-butanone, 2-pentanone, ethyl acetate, propyl acetate, butyl acetate, chlorobenzene, and toluene.

The amount of suitable solvent in the coating composition of the present invention is that amount sufficient to solubilize the grafted cellulose ester. Typically, this amount is about 60 to about 90 weight % of total coating composition, preferably about 65 to about 75 weight %. It is contemplated that mixtures of solvents can be used in the coatings (and processes) of the present invention.

The coating compositions of the present invention optionally contain a photoinitiator. The amount of photoinitiator is typically about 2 to about 7 weight % based on the weight of the non-volatile content of the coating composition; preferably about 3 to about 5 weight %. Suitable photoinitiators include acetophenone/and benzophenone/tertiary amine combinations, organic peroxides, benzoin and its ethers, benzil and benzil ketals. A typical photoinitiator is Irgacure® 651, available from Ciba-Geigy.

The coating composition may optionally contain other formulation additives which contribute to the non-volatile content of the composition. Such additives include, for example, leveling agents, antifoamants, and the like. Such additives may be present in an amount of from about 0.1 to about 5 weight % of total coating composition, preferably about 0.1 to about 1.0 weight %.

The coating composition may also optionally contain unreacted starting materials or derivatives thereof used to prepare the desired cellulose ester. Such unreacted starting materials or derivatives thereof typically include meth(acrylic) anhydride or meth(acrylic) acid. The coating compositions may also optionally contain auxiliary chemicals such as a polymerization inhibitor and/or a urethane bond-forming catalyst. To prepare the coated article of the present invention, the cellulose ester of the present invention is applied to a substrate and then is cured (i.e., polymerized and crosslinked), in the presence of a photoinitiator such as Irgacure® 651 benzil ketal, Irgacure® 184 benzil, or Darocure® 1173 benzil, by an amount of ultraviolet light sufficient to effect the desired degree of curing. The substrate can be wood; plastic; metal such as aluminum or steel; cardboard, glass; cellulose esters such as cellulose acetate butyrate sheeting; various blends containing, for example, polypropylene, polypropylene and glass, polycarbonate, and various polyesters such as polyethylene terephthalate; as well as other solid substrates.

The use of auxiliary polymerizable monomers such as acrylate esters, styrene, vinyl acetate, and others for curing is not necessary and is optional since the grafted cellulose esters of the present invention are capable of self-crosslinking.

The curing of the grafted cellulose esters of the present invention can be carried out in the liquid or solid state (i.e., as a dry film).

Depending upon the thickness of the coating (film), product formulation, photoinitiator type, radiation flux, and source of radiation, exposure times to ultraviolet radiation of about 0.5 to 10 seconds are typically required for curing.

The coating on the coated article of the present invention typically has a solvent resistance of at least about 100 rubs using ASTM Procedure D-3732; preferably a solvent resistance of at least about 200 rubs. Such coating also typically has a pencil hardness of greater than or equal to F using ASTM Procedure D-3363; preferably a pencil hardness of greater than or equal to H.

In either of the two processes for preparing the grafted cellulose ester of the present invention it is preferred that the meth(acryloyl) halide is meth(acryloyl) chloride. Also in either of these processes it is preferred that the cellulose ester starting material has a degree of substitution per anhydroglucose unit of residual hydroxyl groups of about 0.3 to about 0.9.

The cellulose ester starting materials may be of the acetate, propionate, or butyrate type, or mixed esters thereof. The degree of substitution (DS) per anhydroglucose unit (AGU) of residual hydroxyl groups for these cellulose esters in the range of about 0.1 to 2.0 with about 0.3 to 0.9 being a preferred range. These esters include CAB-551, CAB-553, CAB-381, CAP-482, CAP-504, and CA-398, all commercially available from Eastman Chemical Products, Inc., Kingsport, Tenn. Such cellulose ester starting materials typically have a number average molecular weight of between about 10,000 and about 75,000. The m-isopropenyl-2,2'-dimethylbenzyl isocyanate is commercially available from American Cyanamid and is sold under the tradename TMI.

The molar proportions of starting materials used in either process of the present invention are those proportions sufficient to result in the desired degree of substitution of the cellulose ester to achieve the desired product. The mole ratio of (meth)acrylic anhydride or meth-(acryloyl) halide to the grafted TMI of the intermediate reaction product (b) is typically about 0.13 to about 5.0, preferably about 0.18 to about 1.3. In the other process, the mole ratio of m-isopropenyl-2,2'-dimethylbenzyl isocyanate to the grafted (meth)acrylate moiety of intermediate reaction product (b) is about 0.8 to about 8.0, preferably about 0.8 to about 5.0.

When meth(acryloyl) halide is used in a process of the present invention, a hydrogen acceptor must also be used. The amount of hydrogen acceptor used is typically in an amount equimolar to the amount of (meth-)acryloyl halide used. Typical hydrogen acceptors include, but are not limited to pyridine, triethylamine, sodium carbonate, and sodium acetate.

Suitable solvents for preparing the grafted cellulose ester of the present invention in general are the same as those solvents suitable for use in the coating compositions of the invention. Such solvents include ketones, esters, aromated hydrocarbons, and chlorinated hydrocarbons. Specific examples include, but are not limited to, acetone, 2-butanone, 2-pentanone, ethyl acetate, propyl acetate, butyl acetate, chlorobenzene, and toluene. Reactions are typically carried out in about 10 to 40 weight % solvent solutions based upon the weight of the cellulose ester starting material.

Urethane bond-forming catalysts useful in the present invention include dialkyl tin esters and tertiary amines. Specific examples include, but are not limited to, diethyl and dibutyl tin dilaurates, triethylamine, pyridine, diazobicyclo-octane, and dimethylaminopyridine. A typical catalyst concentration used is about 0.1% to 5.0% based upon the weight of the ungrafted cellulose ester starting material.

The synthesis processes of the present invention preferably proceed in the presence of a polymerization inhibitor to prevent premature curing. Typically, the amount of polymerization inhibitor is about .01% to about 1.0 weight % based on the weight of cellulose ester. Specific examples of polymerization inhibitors include, but are not limited to hydroquinone monomethyl ether, chloranil, hydroquinone, and phenothiazine.

In the synthesis processes of the present invention, the reaction is performed under conditions such that the desired product is formed. Typically the reaction period is about 4 to about 30 hours, preferably about 6 to about 22 hours. The temperature during reaction is typically about 40° C. to about 160° C., preferably about 55° C. to about 100° C.

A preferred process of the present invention [including forming the intermediate product(s)] is summarized in the following sequential steps:

1. An appropriate cellulose ester starting material is dissolved in a suitable solvent such as n-propyl acetate to obtain a solvent mixture.
2. Any water present is azeotroped off (at 100° C.) and the solvent mixture is then optionally cooled to about 25°–35° C.
3. A polymerization inhibitor is then added to the solvent mixture.
4. (meth)Acrylic anhydride is then added and the mixture is heated to 40° to 60° C.
5. A urethane bond-forming catalyst is then added to the mixture and the mixture is optionally cooled.
6. m-Isopropenyl-2,2'-dimethylbenzyl isocyanate is then added to the mixture which is then refluxed until isocyanate absorbance cannot be detected by infrared (IR) analysis.
7. The mixture is then cooled and optionally filtered.

Of course, in accordance with the invention, Steps 5 and 6 above can precede Step 4.

In the process of the invention for facilitating isolation of the grafted cellulose ester, the nonsolvent is a liquid in which the grafted cellulose ester is not soluble. Such nonsolvents include, for example, water, methanol, ethanol, isopropanol, hexane, heptane, and mixtures thereof. The amount of nonsolvent used in such process is that amount sufficient to precipitate the grafted cellulose ester; typically this amount is about 25 to about 75 weight % of nonsolvent based on the total weight of the mixture. It is preferred that such process includes the additional step of separating the precipitated grafted cellulose ester from unprecipitated reaction by-products. Unprecipitated by-products typically include (meth)acrylic acid, urea of TMI, (meth)acrylic anhydride, urethane-catalyst, or mixtures thereof.

In a preferred process for isolating and/or facilitating isolating the grafted cellulose ester, after Step 6, as described above for the preferred synthesis process, the following sequential steps are followed:

7. Drown (i.e., dilute with an amount sufficient to precipitate the grafted cellulose ester) the mixture in nonsolvent.
8. Filter and dry the resulting solids.

In addition, after the formation of the intermediate product (i.e., after the reaction of (meth)acrylate based starting material, or reaction of m-isopropenyl-2,2'-dimethylbenzyl isocyanate, whichever is reacted first) said intermediate reaction product can also be isolated by the steps of drowning in nonsolvent, filtering, and drying. Also, the drowning, filtering and drying steps may be repeated to further purify the desired product.

The following examples are to illustrate the present invention but should not be interpreted as a limitation thereon:

EXAMPLE I Sample 1—Comparative

A clean and dry flask equipped with a condenser, stirrer, and thermometer is charged with 500 grams (g) of substantially water-free acetone and 100 g of dry cellulose acetate propionate having about 40 weight % propionyl, and about 2 weight % acetyl -DS/AGU of residual hydroxyl groups of about 0.9 (CAP 504.2) which is commercially available from Eastman Chemical Products, Inc. After the CAP 504.2 has dissolved, 76 g of triethylamine and 0.5 g of hydroquinone monomethyl ether (HQMME) are added. The reaction mixture is heated to reflux where upon 114 g of methacrylic anhydride is added over 30 minutes. The reaction is refluxed for 6 hours and cooled to 25° to 30° C. It is drowned into 1 liter of water with high-speed agitation. The near white cellulose ester is filtered, washed with water, and dried at 50° to 55° C. in a forced-air oven. Analysis by NMR showed a methacrylate (MA) content of 18.6 mol % which corresponds to a degree of substitution per anhydroglucose unit (DS/AHG) of 0.52.

Sample 2

To 500 g of urethane-grade propyl acetate solvent was added 150 g of dry CAP 504.2 methacrylate (0.52 DS) (prepared as in Sample 1). After the cellulose ester dissolved, 0.5 g dibutyltin dilaurate (urethane bond-forming catalyst), 0.5 g HQMME, and 25 g of TMI (meta-isopropenyl-2,2'-dimethylbenzyl isocyanate by American Cyanamid). The reaction mixture is refluxed and the progress of the reaction is followed by measuring the disappearance of the —NCO absorption (~2280 $cm^{-1}$) in the infrared spectrum of the reaction mixture. When the -NCO absorption is no longer discernable from the baseline (usually 16 to 24 hours), the reaction is judged to be complete. The reaction mixture is cooled to 25° to 30° C. and drowned into 1 liter of hexane with high-speed agitation using an Omni mixer. The precipitated cellulose ester is filtered and dissolved in 400 mL of acetone. This solution is drowned into 1 liter of water and the precipitated cellulose ester is filtered and dried at 50° to 55° C. in a forced-air oven. The mole ratio of methacrylate to TMI by NMR was 1.73.

Sample 3—Comparative

To 500 g of substantially water-free acetone in a clean and dry flask equipped with a condenser, stirrer, and thermometer is added 100 g of dry CAP 504.2. After dissolution is complete, 0.5 g of HQMME and 8.9 g of triethylamine (hydrogen acceptor) are added. The solution is cooled with a water bath as 80 g of acryloyl chloride is added. The temperature of the flask contents is maintained at 20° to 30° C. When the addition is complete, the reaction mixture is stirred at 40° to 50° C. for 6 hours. The mixture is cooled to 25° to 30° C. and is drown into 1 liter of water with high-speed agitation. The precipitated cellulose ester is water-washed and dried at 50° to 55° C. in a forced-air over. Analysis by NMR showed an acrylate (A) content of 9.6 mole % which corresponds to a DS of 0.24.

Sample 4

To 140 g of the dry acrylated CAP 504.2 (prepared as in Sample 3) dissolved in 500 g of urethane-grade n-propyl acetate are added 0.5 g of dibutyl tin dilaurate, 0.5 g HQMME, and 39 g of TMI (meta-isopropenyl-2,2'-dimethylbenzyl isocyanate). The reaction mixture is refluxed until the —NCO absorption (~2,280 $cm^{-1}$) in the infrared spectrum can no longer be discerned from the baseline. This usually requires 16 to 24 hours. The reaction mixture is then cooled to 25° to 30° C. and drowned into 1 liter of hexane using high-speed agitation by an Omni mixer. The precipitated cellulose ester is dissolved in 300 g of acetone and drown into 1 liter of water. The light cream cellulose ester is dried at 50° to 55° C. in a forced-air oven. The mole ratio of acrylate to TMI by NMR was 0.4.

Sample 5

A solution is made consisting of 100 g of dry CAP 504.2 and 500 g of urethane-grade propyl acetate. The solution is brought to reflux and approximately 100 g of propyl acetate is distilled out to azeotropically dry cellulose ester. The solution is cooled to 50° to 60° C. and 0.5 g of dibutyltin dilaurate and 33 g of TMI (meta-isopropenyl-2,2'-dimethyl benzyl isocyanate) are added. The reaction mixture is refluxed until the —NCO absorption in the infrared spectrum of the reaction mixture is no longer discernable from the baseline. The reaction mixture is cooled to 25″ to 30° C. The following are added: 26 g of triethylamine, 0.5 g HQMME, and 40 g of methacrylic anhydride. The reaction mixture is refluxed for 6 hours, cooled to 25° to 30° C., and drown into 1 liter of hexane with highs-speed agitation. The precipitated product is redissolved in 300 mL of acetone and drown into 1 liter of water with high speed agitation. The cellulose ester was filtered and dried at 50° to 55° C. The analysis of the cellulose ester by NMR showed the mole ratio of methacrylate to TMI to be 0.6.

Sample 6

In a similar manner as described in Sample 5, dry CAP 504.2 is reacted in urethane-grade propyl acetate solution containing 0.5 g dibutyltin dilaurate with 33 g of TMI. When the reaction is complete using infrared spectroscopy, the mixture is cooled to 20° to 30° C. While maintaining the temperature of the reaction mixture at 20° to 30° C. with a water cooling bath, the following are sequentially added: 0.5 g of HQMME, 23 g of triethylamine, and 20 g of acryloyl chloride. The reaction mixture is maintained at 40° to 50° C. for 6 hours, cooled to 20° to 30° C., and drowned into 1 liter of hexane with high-speed agitation. The precipitated cellulose ester is filtered, dissolved in 300 mL of acetone, and drowned into 1 liter of water. The product is filtered and dried at 50° to 55° C. in a forced-air oven. Analysis of NMR showed the mole ratio of acrylate to TMI to be 0.4.

Sample 7 (Comparative)

A sample of CAP 504.2 grafted with TMI (0.9 DS) was prepared by refluxing a solution prepared from 500 g urethane-grade n-propyl acetate, 100 g of dry CAP 504.2, and 59 g of TMI. All the TMI reacted as evidenced by the absence of —NCO absorption in the infrared spectrum of the reaction mixture. The mixture was cooled to 25° to 30° C. and drowned into 1 liter of hexane. The precipitated product was filtered and dried in a forced-air oven at 50° to 55° C.

Samples 8-16

Using procedures substantially similar to those described in Samples 1-7, comparative Samples 8-12 and Sample 13-16 were prepared.

Sample 8: CAP 504.2 grafted with TMI(0.3DS).

Sample 9 Cellulose acetate butyrate having about 47 weight % butyryl and about 2 weight % acetyl - DS/AGU of residual hydroxyl groups of about 0.8 (CAB 553, available from Eastman Chemical Products, Inc.) grafted with TMI(0.3DS).

Sample 10: CAB 553 grafted with TMI(0.8DS).

Sample 11: CAB 553 grafted with MA(0.4DS).

Sample 12: CAB 553 grafted with A(0.2DS).

Sample 13: CAB 553 grafted first with MA(0.4DS) and then with TMI(0.3DS).

Sample 14: CAB 553 grafted first with A(0.24DS) and then with TMI(0.5DS).

Sample 15: CAB 553 grafted first with TMI(0.4DS) then with MA(0.3DS).

Sample 16: CAB 553 grafted first with TMI(0.4DS) then with A(0.2DS).

Coating Compositions of Grafted Cellulose Esters

Solutions of grafted cellulose ester prepared as described hereinbefore (Samples 1-16) were made up in propyl acetate with a concentration of 20% by weight of the cellulose ester and containing 5% by weight of photoinitiator (Irgacure 651 by Ciba-Geigy) based upon the weight of the grafted cellulose ester.

Coating of Substrates

These formulations are used to coat a variety of substrates such as glass, wood, metal, and plastics. For each type, the coating operation is the same. The substrate is coated with one of the above formulations using a knife blade or draw-down rod. The wet film thickness is about 8 mil. The solvent is evaporated to give a clear non-tacky film with a thickness of 1 to 1.5 mil. The film readily dissolves in organic solvents.

Film Curing

The dried film is exposed to ultraviolet radiation from a 200 watt per inch medium pressure mercury vapor lamp housed in an American Ultraviolet Company instrument using a belt speed of 25 ft. per minute. Two to ten passes under the lamp results in a crosslinked coating with maximum hardness and solvent resistance.

Coating Evaluations

Pencil hardness (ASTM D3363), solvent resistance by the methyl ethyl ketone double-rub test, and solubility in acetone are measured for each film before and after exposure to ultraviolet radiation. Data is presented below for coatings made by varying the cellulose ester, the DS per AHG of the grafted α-methyl styrene and (meth)acrylate moieties. Data for control coatings are also obtained for comparison.

The pencil hardness scale is in order of increasing hardness:

| 5B | 4B | 3B | 2B | B | HB | F | H | 2H | 3H | 4H | 5H |
|----|----|----|----|---|----|---|---|----|----|----|----|

The methyl ethyl ketone (MEK) double rub test is carried out by saturating a piece of cheesecloth with methyl ethyl ketone, and with moderate pressure rub the coating back and forth. The number of double rubs is counted until the coating is removed. This test is in accordance with ASTM Procedure D-3732.

The acetone solubility test is carried out by immersing a dry, pre-weighed sample of the film in acetone for 48 hours at 20° to 25° C. The film is removed, dried for 16 hours in a 55° to 60° C. forced-air oven, and weighed. The weight percent of the insoluble film remaining is calculated from the data.

COATING EVALUATIONS[1]

| | Before Irradiation | | | After Irradiation | | |
|---|---|---|---|---|---|---|
| Resin Description | Pencil Hardness | MEK Rubs | Acetone Insolubles | Pencil Hardness | MEK Rubs | Acetone Insolubles |
| CAP 504 (Control) | B | <5 | Complete Dissolution | B | <5 | Complete Dissolution |
| CAB 553 (Control) | 2B | <5 | Complete Dissolution | 2B | <5 | Complete Dissolution |
| CAP 504-TMI (0.3 DS) (Sample 8) | F | <5 | Complete Dissolution | F | <5 | Complete Dissolution |
| CAP 504-TMI (0.9 DS) (Sample 7) | F | <5 | Complete Dissolution | F | <5 | Complete Dissolution |
| CAB 553-TMI (0.3 DS) (Sample 9) | B | <5 | Complete Dissolution | HB | <5 | Complete Dissolution |
| CAB 553-TMI (0.8 DS) (Sample 10) | B | <5 | Complete Dissolution | B | <5 | Complete Dissolution |
| CAP 504-MA (0.5 DS) (Sample 1) | B | <5 | Complete Dissolution | F/H | 99 | 31% |
| CAP 504-A (0.25 DS) (Sample 3) | HB | <5 | Complete Dissolution | F | 62 | 43% |
| CAB 553-MA (0.4 DS) (Sample 11) | B | <5 | Complete Dissolution | F | 109 | 48% |
| CAB 553-A (0.2 DS) (Sample 12) | HB | <5 | Complete Dissolution | F | 41 | 29% |
| CAP 504-MA (0.5 DS) - TMI (0.3 DS) (Sample 2) | HB | <5 | Complete Dissolution | 2H | >200 | 94 |
| CAP 504-A (0.25 DS) - TMI (0.6 DS) (Sample 4) | F | <5 | Complete Dissolution | 2H | >200 | 82 |
| CAB 553-MA (0.4 DS) - TMI (0.3 DS) (Sample 13) | HB | <5 | Complete Dissolution | H/2H | >200 | 91 |
| CAB 553-A (0.24 DS) - TMI (0.5 DS) (Sample 14) | HB | <5 | Complete Dissolution | H | >200 | 88 |
| CAP 504-TMI (0.5 DS) - MA (0.3 DS) (Sample 5) | F | <5 | Complete Dissolution | H/2H | >200 | 80 |
| CAP 504-TMI (0.5 DS) - A (0.2 DS) (Sample 6) | F | <5 | Complete Dissolution | H | 144 | 68 |
| CAB 553-TMI (0.4 DS) - MA (0.3 DS) (Sample 15) | HB | <5 | Complete Dissolution | F | 189 | 78% |
| CAB 553-TMI (0.4 DS) - A (0.2 DS) (Sample 16) | F | <5 | Complete Dissolution | HF | 98 | 41% |
| Stalink 105[2] (CAP 504-based) (Control) | HB | <5 | Complete Dissolution | HB | 44 | 31% |
| Stalink 106[2] (CAB 553-based) (Control) | B | <5 | Complete Dissolution | B | 15 | 41% |

-continued

COATING EVALUATIONS[1]

| Resin Description | Before Irradiation | | | After Irradiation | | |
|---|---|---|---|---|---|---|
| | Pencil Hardness | MEK Rubs | Acetone Insolubles | Pencil Hardness | MEK Rubs | Acetone Insolubles |
| Nitrocellulose Lacquer (Control) | 3B | <5 | Complete Dissolution | 2B | <5 | Complete Dissolution |

[1]All coatings contain 5% by weight of Irgacure 651 based upon the weight of the grafted cellulose ester.
[2]Stalink is the tradename of A. E. Staley's product from the reaction of CAP 504 and CAB 553 with n-methylolacrylamide.

EXAMPLE II

The following example compares the present invention with the technology disclosed in U.S. Pat. No. 4,565,857. In particular, this example compares the pencil hardness and solvent resistance of crosslinkable cellulose ester coatings containing equivalent number of polymerizable double bonds. More specifically what is being compared is: (1) coatings of cellulose ester grafted with m-isopropenyl-2,2'-dimethylbenzyl isocyanate (TMI) admixed with (meth)acrylate monomer as taught by U.S. Pat. No. 4,565,857; and (2) coatings of cellulose ester grafted with methacrylate and TMI with no admixed acrylate monomer as taught by the present invention. The amount of admixed acrylate monomer was adjusted such that the total number of polymerizable double bonds was the same in each coating.

Description of the experiment: CAP 504.2 containing 0.5 DS/AHG of grafted TMI was used as being representative of the technology in U.S. Pat. NO. 4,565,857. To 25 grams of a 20% solution of the cellulose ester in propyl acetate solvent based upon the cellulose ester was added an amount of (meth)acrylate monomer that would correspond to a DS/AHG of 0.3 if it were grafted to the cellulose ester. This would give a total "apparent" DS/AHG of polymerizable double bonds of 0.8. The following table gives the weights of admixed (meth)acrylate monomers added to the CAP 504.2 grafted with 0.5 DS/AHG TMI:

| Admixed Monomer | Weight Added | Wt % |
|---|---|---|
| Methyl Methacrylate | 0.26 grams | 4.9% |
| Isobornyl Acrylate | 0.62 grams | 11.0% |
| 2-Ethylhexyl Methacrylate | 0.59 grams | 10.6% |
| 2-Hydroxyethyl Methacrylate | 0.39 grams | 7.2% |
| Trimethylolpropane Triacrylate | 0.26 grams | 4.9% |

Two samples of a cellulose ester grafted with methacrylate and TMI but not admixed with (meth)acrylates that are representative of the present invention are as follows:
CAP 504.2 grafted with 0.5 DS/AHG methacrylate and 0.3 DS/AHG TMI
CAP 504.2 grafted with 0.4 DS/AHG TMI and 0.3 DS/AHG methacrylate Each formulation contained 5% by weight of photoinitiator (Irgacure 651 by Ciba-Geigy) based upon the weight of the cellulose ester and any admixed (meth)arcylate monomer.

Glass plates were coated with each formulation and dried either at 45° C. for 18 hours or at 25° C. for 12 hours. Pencil hardness and solvent resistance testing was carried out (as in Example I) on the dry film before and after irradiation with an 80 watt medium pressure mercury vapor lamp with four passes at a beltspeed of 25 ft/minute.

The data are given below:

| ESTER | Before Irradiation | | After Irradiation | |
|---|---|---|---|---|
| | MEK RUBS | Pencil Hardness | MEK RUBS | Pencil Hardness |
| *Dried at 25° C.* | | | | |
| CAP 504.2 | <5 | HB | <5 | F |
| CAP 504.2-0.5 DS TMI | <5 | F | <5 | F |
| CAP 504.2-0.5 DS TMI ADMIXED WITH THE FOLLOWING MONOMERS: | | | | |
| Methyl Methacrylate | <5 | B | 20 | HB |
| Isobornyl Acrylate | <5 | 4B | 31 | F |
| 2-Ethylhexyl Methacrylate | <5 | 3B | 21 | HB |
| 2-Hydroxyethyl Methacrylate | <5 | 2B | 64 | F |
| Trimethylolpropane Triacrylate | <5 | 2B | 108 | F/H |
| CAP 504.2-0.5 DS MA -0.3 DS TMI | <5 | HB | >200 | 2H |
| CAP 504.2-0.4 DS TMI -0.3 DS MA | <5 | F | >200 | H/2H |
| *Dried at 45° C.* | | | | |
| CAP 504.2 | <5 | F | <5 | F |
| CAP 504.2-0.5 DS TMI | <5 | F | <5 | F |
| CAP 504.2-0.5 DS TMI ADMIXED WITH THE FOLLOWING MONOMERS: | | | | |
| Methyl Methacrylate | < | F | 8 | F |
| Isobornyl Acrylate | <5 | B | 20 | HB/F |
| 2-Ethylhexyl Methacrylate | <5 | B | 5 | B/HB |
| 2-Hydroxyethyl Methacrylate | <5 | B | 8 | HB/F |
| Trimethylolpropane Triacrylate | <5 | B | 68 | F |
| CAP 504.2-0.5 DS MA -0.3 DS TMI | <5 | HB | >200 | 2H |
| CAP 504.2-0.4 DS TMI -0.3 DS MA | <5 | F | >200 | H/2H |

NOTES: The pencil hardness scale is as follows:
4B 3B 2B B HB F H 2H 3H 4H
(VERY SOFT)         (VERY HARD)
and is determined according to ASTM Procedure D3363.

The MEK solvent resistance test is the number of double rubs needed to rub through the coating using a piece of cheese cloth saturated with methyl ethyl ketone and using moderate pressure in accordance with ASTM Procedure D-3732.

I claim:

1. An ethylenically unsaturated self-crosslinkable grafted cellulose ester of the formula

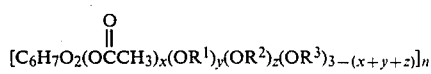

wherein:

$R^1$ is a (meth)acrylate moiety of the formula

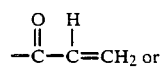

-continued

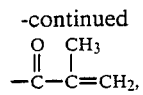

$R^2$ is α-methylstyrene moiety of the formula

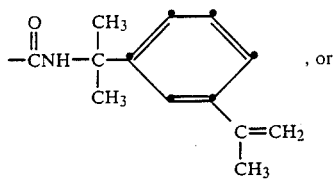

$R^3$ is, independently, H,

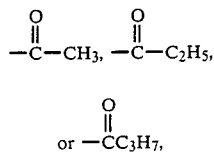

x is about 0.1 to 2.5,
y is about 0.1 to 2.0,
z is about 0.1 to 2.0, and
n is 30-250,
provided that (x+y+z) is in the range of 0.3 to 3.0.

2. The cellulose ester of claim 1 wherein x is about 0.1 to 0.25, y is about 0.1 to 0.5, and z is about 0.1 to 0.9.

3. A coating composition comprising
(a) An ethylenically unsaturated self-crosslinkable grafted cellulose ester of the formula

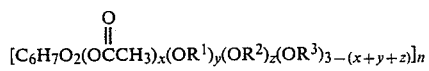

wherein:
$R^1$ is a (meth)acrylate moiety of the formula

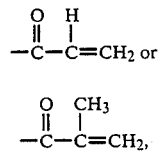

$R^2$ is α-methylstyrene moiety of the formula

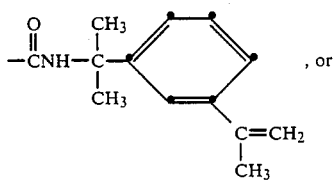

-continued

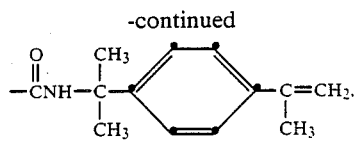

$R^3$ is, independently, H,

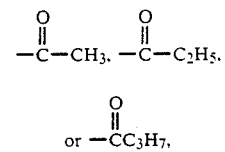

x is about 0.1 to 2.5,
y is about 0.1 to 2.0,
z is about 0.1 to 2.0, and
n is 30-250,
provided that (x+y+z) is in the range of 0.3 to 3.0, and
(b) a solvent in an amount sufficient to solubilize (a)

4. The coating composition of claim 3 wherein said suitable solvent is acetone, 2-butanone, 2-pentanone, ethyl acetate, propyl acetate, butyl acetate, chlorobenzene, or toluene.

5. The coating composition of claim 3 further comprising a urethane bond-forming catalyst or a polymerization inhibitor.

6. The coating composition of claim 3 wherein said solvent is present in an amount of about 60 to about 90 weight % of the total composition.

7. The coating composition of claim 3 further comprising acrylic acid, methacrylic acid, acrylic anhydride or methacrylic anhydride.

8. The coating composition of claim 3 further comprising from about 0.1 to about 5 weight % of a leveling agent, based on the weight of the total composition.

9. The coating composition of claim 3 further comprising from about 2 to about 7 weight % of a photoinitiator, based on the weight of the total composition.

10. The composition of claim 9 wherein said photoinitiator is present in an amount of about 3 to about 5 weight % of the total composition.

11. An article comprising
(a) a substrate, and
(b) a coating thereon comprising a polymerized ethylenically unsaturated self-crosslinkable grafted cellulose ester of the formula

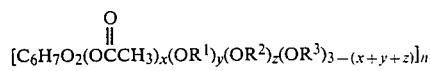

wherein:
$R^1$ is a (meth)acrylate moiety of the formula

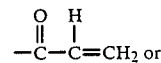

$R^2$ is α-methylstyrene moiety of the formula

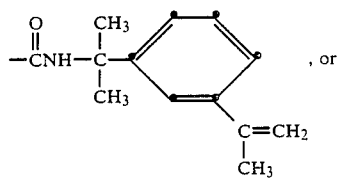, or

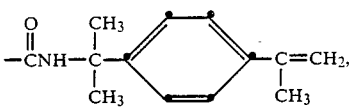

R[3] is, independently, H,

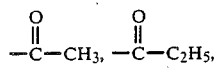

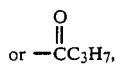

x is about 0.1 to 2.5,
y is about 0.1 to 2.0,
z is about 0.1 to 2.0, and
n is 30–250,
provided that (x+y+z) is in the range of 0.3 to 3.0.

12. The article of claim 11 wherein said coating has a solvent resistance of at least 200 rubs using ASTM Procedure D-3732, and a pencil hardness of greater than or equal to F using ASTM Procedure D3363.

13. The article of claim 12 wherein said coating has a pencil hardness of greater than or equal to H using ASTM Procedure D3363.

14. A process for preparing an ethylenically unsaturated self-crosslinkable grafted cellulose ester of the formula

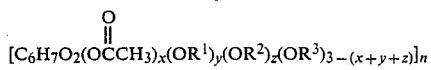

wherein:
R[1] is a (meth)acrylate moiety of the formula

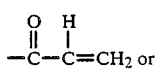

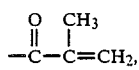

R[2] is α-methylstyrene moiety of the formula

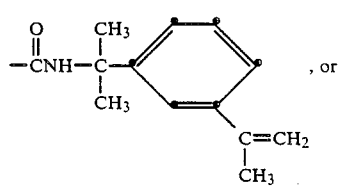, or

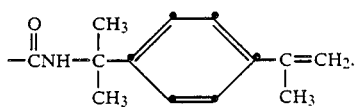

R[3] is, independently, H,

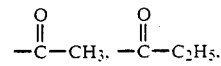

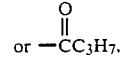

x is about 0.1 to 2.5,
y ix about 0.1 to 2.0,
z is about 0.1 to 2.0, and
n is 30–250,
provided that (x+y+z) is in the range of 0.3 to 3.0, comprising: reacting
(a) (meth)acrylic anhydride, or a mixture of (meth)acryloyl halide and a hydrogen acceptor, with
(b) an intermediate reaction product of
(i) a cellulose ester of cellulose and at least one saturated monocarboxylic acid having 2 to 4 carbon atoms, wherein said cellulose ester has a degree of substitution per anhydroglucose unit of residual hydroxyl groups of about 0.1 to 2.0, and
(ii) meta-isopropenyl-2,2'-dimethylbenzyl isocyanate or para-isopropenyl-2,2'-dimethylbenzyl isocyanate,
in the presence of a solvent and under conditions such that the desired product is formed.

15. The process of claim 14 carried out at a temperature between about 40° to 60° C.

16. The process of claim 14 carried out in the presence of a polymerization inhibitor in an amount of about 0.01% to about 1.0 weight % based on the weight of grafted cellulose ester.

17. The process of claim 14 wherein said cellulose ester has a degree of substitution per anhydroglucose unit of residual hydroxyl groups of about 0.3 to 0.9.

18. The process of claim 14 wherein said suitable solvent is acetone, 2-butanone, ethyl acetate, 2-pentanone, butyl acetate, propyl acetate, chlorobenzene, or toluene.

19. A process for preparing an ethylenically unsaturated self-crosslinkable grafted cellulose ester of the formula

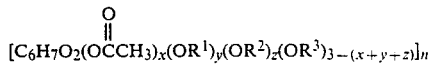

wherein:
R1 is a (meth)acrylate moiety of the formula

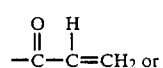

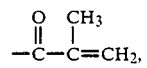

R[2] is α-methylstyrene moiety of the formula

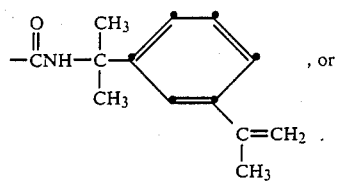

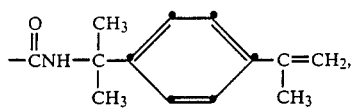

R3 is, independently, H,

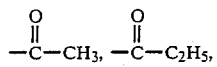

or 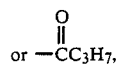

x is about 0.1 to 2.5,
y is about 0.1 to 2.0,
z is about 0.1 to 2.0, and
n is 30–250,
provided that (x+y+z) is in the range of 0.3 to 3.0, comprising: reacting
(a) meta-isopropenyl-2,2'-dimethylbenzyl isocyanate or para-isopropenyl-2,2'-dimethylbenzyl isocyanate, with
(b) an intermediate reaction product of
  (i) a cellulose ester of cellulose and at least one saturated monocarboxylic acid having 2 to 4 carbon atoms, wherein said cellulose ester has a degree of substitution per anhydroglucose unit of residual hydroxyl groups of about 0.1 to 2.0, and
  (ii) (meth) acrylic anhydride, or (meth)acryloyl halide and a hydrogen acceptor,
in the presence of a solvent and a catalytic amount of a urethane bond-forming catalyst and under conditions such that the desired product is formed.

20. The process of claim 19 carried out and at a temperature between about 60° to 160° C.

21. The process of claim 19 carried out in the presence of a polymerization inhibitor.

22. The process of claim 19 wherein said cellulose ester has a degree of substitution per anhydroglucose unit of residual hydroxyl groups of about 0.3 to 0.9.

23. The process of claim 19 wherein said suitable solvent is acetone, 2-butanone, ethyl acetate, 2-pentanone, butyl acetate, propyl acetate, chlorobenzene or toluene; and said catalytic amount of urethane bond-forming catalyst is about 0.1 to about 5.0 weight % based on the weight of ungrafted cellulose ester starting material.

24. The process for facilitating isolating an ethylenically unsaturated self-crosslinkable grafted cellulose ester of the formula

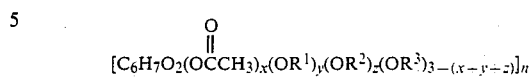

wherein:
R$^1$ is a (meth)acrylate moiety of the formula

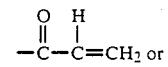

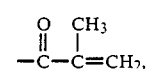

R$^2$ is α-methylstyrene moiety of the formula

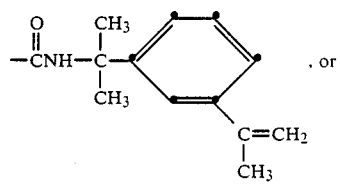

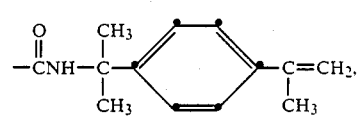

R$^3$ is, independently, H,

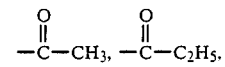

or 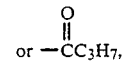

x is about 0.1 to 2.5,
y is about 0.1 to 2.0,
z is about 0.1 to 2.0, and
n is 30–250,
provided that (x+y+z) is in the range of 0.3 to 3.0
and wherein said cellulose ester is in unprecipitated form and is in a mixture with reaction by-products and a solvent,
comprising: contacting said mixture with an amount of nonsolvent sufficient to precipitate the desired product.

25. The process of claim 24, including the additional step of separating the precipitated product from unprecipitated by-products.

26. The process of claim 25 wherein said nonsolvent is selected from the group consisting of water, methanol, ethanol, isopropanol, hexane, heptane and mixtures thereof.

* * * * *